US010219360B2

(12) United States Patent
Vendetti et al.

(10) Patent No.: US 10,219,360 B2
(45) Date of Patent: Feb. 26, 2019

(54) SYSTEMS AND METHODS FOR OUTDOOR LUMINAIRE WIRELESS CONTROL

(71) Applicant: Express Imaging Systems, LLC, Renton, WA (US)

(72) Inventors: Donald Arthur Vendetti, Seattle, WA (US); Richard Dolf, Seattle, WA (US); William G. Reed, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 0 days.

(21) Appl. No.: 15/943,183

(22) Filed: Apr. 2, 2018

(65) Prior Publication Data
US 2018/0288860 A1 Oct. 4, 2018

Related U.S. Application Data

(60) Provisional application No. 62/480,833, filed on Apr. 3, 2017.

(51) Int. Cl.
*H05B 37/02* (2006.01)
*F21V 23/06* (2006.01)
(Continued)

(52) U.S. Cl.
CPC ......... *H05B 37/0272* (2013.01); *F21V 23/06* (2013.01); *F21V 15/01* (2013.01); *F21W 2131/103* (2013.01)

(58) Field of Classification Search
CPC ............................ H05B 37/02; H05B 37/0227; H05B 37/0272; F21V 23/06; F21V 15/01; F21W 2131/103
(Continued)

(56) References Cited

U.S. PATENT DOCUMENTS 2,745,055 A 5/1956 Woerdemann
4,153,927 A 5/1979 Owens
(Continued)

FOREIGN PATENT DOCUMENTS

CN 103162187 A 6/2013
DE 40 01 980 A1 8/1990
(Continued)

OTHER PUBLICATIONS

"Lcd Backlight I/O Ports and Power Protection Circuit Design," dated May 2, 2011, retrieved Jun. 10, 2011, from http://www.chipoy.info/gadgets/lcd-backlight-i-o-ports-and-power-pr..., 4 pages.
(Continued)

*Primary Examiner* — Jimmy Vu
(74) *Attorney, Agent, or Firm* — Cozen O'Connor

(57) ABSTRACT

Systems and methods which leverage the wireless communication capability present in wireless-enabled luminaires where the lamps include a short-range wireless transceiver and can be controlled by a smart appliance. The wireless capability of a luminaire may be paired with a compatible wireless interface system (e.g., adapter system) that allows for control of the luminaire via plug-in or hard-wired photocontrols and wireless network lamp control nodes. An adapter system may be provided that replaces a standard wired receptacle of a luminaire. The adapter system may include a wired interface to the luminaire which provides power to the wireless adapter system. The wireless adapter system may include a receptacle interface that receives a plug of a control node, such as photocontrol or a networked control node. The wireless adapter system may also include a wireless interface circuit that communicates control, status or other data between the connected control device and the luminaire.

28 Claims, 8 Drawing Sheets

(51) Int. Cl.
*F21V 15/01* (2006.01)
*F21W 131/103* (2006.01)

(58) Field of Classification Search
USPC .... 315/151, 209 R, 291, 294, 307, 308, 312
See application file for complete search history.

(56) References Cited

U.S. PATENT DOCUMENTS

| | | |
|---|---|---|
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,838,226 A | 11/1998 | Houggy et al. |
| 5,936,362 A | 8/1999 | Alt et al. |
| 6,111,739 A | 8/2000 | Wu et al. |
| 6,160,353 A | 12/2000 | Mancuso |
| 6,377,191 B1 | 4/2002 | Takubo |
| 6,612,720 B1 | 9/2003 | Beadle |
| 6,674,060 B2 | 1/2004 | Antila |
| 6,753,842 B1 | 6/2004 | Williams et al. |
| 6,828,911 B2 | 12/2004 | Jones et al. |
| 6,841,947 B2 | 1/2005 | Berg-johansen |
| 6,880,956 B2 | 4/2005 | Zhang |
| 6,902,292 B2 | 6/2005 | Lai |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,196,477 B2 | 3/2007 | Richmond |
| 7,218,056 B1 | 5/2007 | Harwood |
| 7,239,087 B2 | 7/2007 | Ball |
| 7,252,385 B2 | 8/2007 | Engle et al. |
| 7,258,464 B2 | 8/2007 | Morris et al. |
| 7,281,820 B2 | 10/2007 | Bayat et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,623,042 B2 | 11/2009 | Huizenga |
| 7,627,372 B2 | 12/2009 | Vaisnys et al. |
| 7,631,324 B2 | 12/2009 | Buonasera et al. |
| 7,633,463 B2 | 12/2009 | Negru |
| 7,665,862 B2 | 2/2010 | Villard |
| 7,677,753 B1 | 3/2010 | Wills |
| 7,688,002 B2 | 3/2010 | Ashdown et al. |
| 7,688,222 B2 | 3/2010 | Peddie et al. |
| 7,697,925 B1 | 4/2010 | Wilson et al. |
| 7,703,951 B2 | 4/2010 | Piepgras et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,183,797 B2 | 5/2012 | McKinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,324,840 B2 | 12/2012 | Shteynberg et al. |
| 8,334,640 B2 | 12/2012 | Reed et al. |
| 8,378,563 B2 | 2/2013 | Reed et al. |
| 8,390,475 B2 | 3/2013 | Feroldi |
| 8,427,076 B2 | 4/2013 | Bourquin et al. |
| 8,436,556 B2 | 5/2013 | Eisele et al. |
| 8,450,670 B2 | 5/2013 | Verfuerth et al. |
| 8,457,793 B2 | 6/2013 | Golding et al. |
| 8,508,137 B2 | 8/2013 | Reed |
| 8,541,950 B2 | 9/2013 | Reed |
| 8,547,022 B2 | 10/2013 | Summerford et al. |
| 8,610,358 B2 | 12/2013 | Reed |
| 8,629,621 B2 | 1/2014 | Reed |
| 8,674,608 B2 | 3/2014 | Holland et al. |
| 8,749,403 B2 | 6/2014 | King et al. |
| 8,810,138 B2 | 8/2014 | Reed |
| 8,872,964 B2 | 10/2014 | Reed et al. |
| 8,878,440 B2 | 11/2014 | Reed |
| 8,896,215 B2 | 11/2014 | Reed et al. |
| 8,901,825 B2 | 12/2014 | Reed |
| 8,922,124 B2 | 12/2014 | Reed et al. |
| 8,926,138 B2 | 1/2015 | Reed et al. |
| 8,926,139 B2 | 1/2015 | Reed et al. |
| 8,975,827 B2 | 3/2015 | Chobot et al. |
| 8,987,992 B2 | 3/2015 | Reed |
| 8,988,005 B2 | 3/2015 | Jungwirth et al. |
| 9,002,522 B2 | 4/2015 | Mohan et al. |
| 9,024,545 B2 | 5/2015 | Bloch et al. |
| 9,107,026 B1 | 8/2015 | Viswanadham et al. |
| 9,119,270 B2 | 8/2015 | Chen et al. |
| 9,204,523 B2 | 12/2015 | Reed et al. |
| 9,210,751 B2 | 12/2015 | Reed |
| 9,210,759 B2 | 12/2015 | Reed |
| 9,288,873 B2 | 3/2016 | Reed |
| 9,312,451 B2 | 4/2016 | Reed et al. |
| 9,357,618 B2 | 5/2016 | Pandharipande et al. |
| 9,414,449 B2 | 8/2016 | Reed |
| 9,466,443 B2 | 10/2016 | Reed |
| 9,572,230 B2 | 2/2017 | Reed |
| 9,693,433 B2 | 6/2017 | Reed et al. |
| 9,713,228 B2 | 7/2017 | Reed |
| 9,801,248 B2 | 10/2017 | Reed et al. |
| 10,009,983 B2 * | 6/2018 | Noesner ............ H05B 37/0272 |
| 2003/0016143 A1 | 1/2003 | Ghazarian |
| 2003/0184672 A1 | 10/2003 | Wu et al. |
| 2004/0192227 A1 | 9/2004 | Beach et al. |
| 2006/0014118 A1 | 1/2006 | Utama |
| 2006/0066264 A1 | 3/2006 | Ishigaki et al. |
| 2006/0146652 A1 | 7/2006 | Huizi et al. |
| 2007/0032990 A1 | 2/2007 | Williams et al. |
| 2007/0102033 A1 | 5/2007 | Petrocy |
| 2007/0225933 A1 | 9/2007 | Shimomura |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0130304 A1 | 6/2008 | Rash et al. |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0230883 A1 | 9/2009 | Haug |
| 2009/0235208 A1 | 9/2009 | Nakayama et al. |

(56) References Cited

U.S. PATENT DOCUMENTS

| | | |
|---|---|---|
| 2009/0261735 A1 | 10/2009 | Sibalich et al. |
| 2009/0278479 A1 | 11/2009 | Planter et al. |
| 2010/0001652 A1 | 1/2010 | Damsleth |
| 2010/0052557 A1 | 3/2010 | Van Der Veen et al. |
| 2010/0123403 A1 | 5/2010 | Reed |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0246168 A1 | 9/2010 | Verfuerth et al. |
| 2010/0259193 A1 | 10/2010 | Umezawa et al. |
| 2010/0271802 A1 | 10/2010 | Recker et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0215724 A1 | 9/2011 | Chakravarty et al. |
| 2011/0221346 A1 | 9/2011 | Lee et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0146518 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0221154 A1 | 8/2012 | Runge |
| 2012/0242254 A1 | 9/2012 | Kim et al. |
| 2012/0286770 A1 | 11/2012 | Schröder et al. |
| 2013/0057158 A1 | 3/2013 | Josefowicz et al. |
| 2013/0126715 A1 | 5/2013 | Flaherty |
| 2013/0141000 A1 | 6/2013 | Wei et al. |
| 2013/0163243 A1 | 6/2013 | Reed |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0028200 A1 | 1/2014 | Van Wagoner et al. |
| 2014/0055990 A1 | 2/2014 | Reed |
| 2014/0159585 A1 | 6/2014 | Reed |
| 2014/0166447 A1 | 6/2014 | Thea et al. |
| 2014/0244044 A1 | 8/2014 | Davis et al. |
| 2014/0359078 A1 | 12/2014 | Liu |
| 2015/0015716 A1 | 1/2015 | Reed et al. |
| 2015/0069920 A1 | 3/2015 | Denteneer et al. |
| 2015/0123563 A1 | 5/2015 | Dahlen |
| 2016/0150622 A1 | 5/2016 | Flinsenberg et al. |
| 2016/0234899 A1 | 8/2016 | Reed et al. |
| 2018/0035518 A1* | 2/2018 | Cook ................. H05B 37/0272 |

FOREIGN PATENT DOCUMENTS

| | | |
|---|---|---|
| EP | 1 734 795 A1 | 12/2006 |
| EP | 2 320 713 A2 | 5/2011 |
| EP | 2 559 937 A1 | 2/2013 |
| EP | 2 629 491 A1 | 8/2013 |
| EP | 1 459 600 B1 | 2/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-535279 A | 8/2008 |
| JP | 2010-504628 A | 2/2010 |
| KR | 10-2005-0078403 A | 8/2005 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2010/086757 A1 | 8/2010 |
| WO | 2010/133719 A1 | 11/2010 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Corrected Notice of Allowance, dated Aug. 12, 2015, and Notice of Allowance, dated Jul. 31, 2015 for Reed et al., "Remotely Adjustable Solid-State Lamp," U.S. Appl. No. 13/875,130, 11 pages.

EE Herald, "Devices to protect High brightness LED from ESD,"dated Mar. 16, 2009, retrieved Jun. 10, 2011, from http://www.eeherald.com/section/new-products/np100779.html, 1 page.

European Office Action, dated Aug. 11, 2017, for European Application No. 13 823 055.2-1802, 4 pages.

Extended European Search Report dated Aug. 25, 2016, for corresponding EP Application No. 14843796.5-1757, 6 pages.

Extended European Search Report dated Jan. 4, 2016, for corresponding EP Application No. 13823055.2-1802, 7 pages.

Extended European Search Report dated Oct. 21, 2015, for corresponding EP Application No. 13835001.2-1802, 7 pages.

Extended European Search Report, dated Aug. 13, 2014, for corresponding European Application No. 09826926.9, 8 pages.

Extended European Search Report, dated May 3, 2016, for corresponding European Application No. 12771286.7, 9 pages.

Extended European Search Report, dated Sep. 28, 2015, for corresponding European Application No. 12850159.0-1802, 6 pages.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.

International Search Report and Written Opinion, dated Feb. 29, 2016, for PCT/US2015/053000, 20 pages.

International Search Report and Written Opinion, dated Feb. 29, 2016, for PCT/US2015/053006, 21 pages.

International Search Report and Written Opinion, dated Jan. 13, 2016. for PCT/US2015/053009, 15 pages.

International Search Report dated Nov. 11, 2014, for International Application No. PCT/US2014/047867, 3 pages.

International Search Report, dated Dec. 13, 2010 for PCT/US2010/035649, 3 pages.

International Search Report, dated Dec. 15, 2010 for PCT/US2010/035658, 3 pages.

(56) References Cited

OTHER PUBLICATIONS

International Search Report, dated Dec. 28, 2010 for PCT/US2010/035651, 3 pages.
International Search Report, dated Dec. 30, 2013 for PCT/US2013/058266, 3 pages.
International Search Report, dated Feb. 26, 2014, for PCT/US2013/070794, 3 pages.
International Search Report, dated Feb. 27, 2013, for PCT/US2012/065476, 3 pages.
International Search Report, dated Jan. 14, 2013, for PCT/US2012/052009, 3 pages.
International Search Report, dated Jul. 9, 2009 for PCT/US2009/043171, 5 pages.
International Search Report, dated Jun. 21, 2010, for PCT/US2009/064625, 3 pages.
International Search Report, dated Nov. 19, 2013 for PCT/US2013/052092, 4 pages.
International Search Report, dated Oct. 8, 2012 for PCT/US2012/033059, 3 pages.
International Search Report, dated Sep. 30, 2011, for PCT/US2011/021359, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Notice of Allowance dated Apr. 11, 2014, for Reed, "Apparatus and Method of Energy Efficient Illumination," U.S. Appl. No. 13/943,537, 9 pages.
Notice of Allowance dated Apr. 12, 2013, for Reed, "Apparatus and Method of Energy Efficient Illumination," U.S. Appl. No. 12/784,093, 9 pages.
Notice of Allowance dated Apr. 27, 2015, for Reed et al., "Apparatus and Method of Operating a Luminaire," U.S. Appl. No. 13/558,191, 8 pages.
Notice of Allowance dated Aug. 29, 2014, for Reed et al., "Adjustable Output Solid-State Lamp With Security Features," U.S. Appl. No. 13/679,687, 9 pages.
Notice Of Allowance dated Jul. 1, 2014, for Reed, "Luminaire With Atmospheric Electrical Activity Detection and Visual Alert Capabilities," U.S. Appl. No. 13/786,114, 9 pages.
Notice of Allowance dated Jul. 30, 2014, for Reed, "Apparatus and Method of Energy Efficient Illumination Using Received Signals," U.S. Appl. No. 13/085,301, 5 pages.
Notice of Allowance dated Jul. 7, 2014, for Reed et al., "Apparatus and Method for Schedule Based Operation of a Luminaire," U.S. Appl. No. 13/604,327, 8 pages.
Notice of Allowance dated Jun. 19, 2015, for Reed et al., "Apparatus and Method for Schedule Based Operation of a Luminaire" U.S. Appl. No. 14/552,274, 9 pages.
Notice Of Allowance dated Jun. 20, 2014, for Reed et al., "Long-Range Motion Detection for Illumination Control," U.S. Appl. No. 12/784,080, 7 pages.
Notice of Allowance dated Mar. 16, 2017, for U.S. Appl. No. 14/552,274, Reed et al., "Apparatus and Method for Schedule Based Operation of a Luminaire," 9 pages.
Notice of Allowance dated Mar. 24, 2017, for Reed, "Apparatus and Method of Energy Efficient Illumination Using Received Signals," U.S. Appl. No. 14/557,275, 23 pages.
Notice of Allowance dated May 23, 2013, for Reed, "Apparatus and Method of Energy Efficient Illumination," U.S. Appl. No. 12/784,091, 6 pages.
Notice of Allowance dated Nov. 5, 2014, for Reed, "Apparatus and Method of Energy Efficient Illumination," U.S. Appl. No. 14/329,508, 10 pages.
Notice of Allowance dated Oct. 5, 2016 for U.S. Appl. No. 14/869,511, Reed, "Centralized Control of Area Lighting Hours of Illumination," 8 pages.
Notice of Allowance dated Sep. 12, 2013, for Reed, "Electrostatic Discharge Protection for Luminaire," U.S. Appl. No. 13/212,074, 6 pages.
Notice of Allowance dated Sep. 30, 2013, for Reed, "Resonant Network for Reduction of Flicker Perception in Solid State Lighting Systems," U.S. Appl. No. 13/592,590, 9 pages.
Notice of Allowance, dated Oct. 14, 2011, for Reed et al., "Low-Profile Pathway Illumination System," U.S. Appl. No. 12/437,472, 9 pages.
Notice of Allowance, dated Jun. 14, 2017, for U.S. Appl. No. 14/557,275, Reed, "Apparatus and Method of Energy Efficient Illumination Using Received Signals," 2 pages.
Notice of Allowance, dated Jun. 22, 2017, for U.S. Appl. No. 14/816,754, Reed et al., "Apparatus and Method of Operating a Luminaire ," 11 pages.
Office Action dated Apr. 21, 2015, for Reed et al., "Remotely Adjustable Solid-State Lamp," U.S. Appl. No. 13/875,130, 10 pages.
Office Action dated Apr. 23, 2014, for Reed, "Apparatus and Method of Energy Efficient Illumination Using Received Signals," U.S. Appl. No. 13/085,301, 12 pages.
Office Action dated Apr. 24, 2013, for Reed, "Apparatus and Method of Energy Efficient Illumination," U.S. Appl. No. 12/784,091, 12 pages.
Office Action dated Aug. 23, 2016, for Reed, "Apparatus and Method of Energy Efficient Illumination Using Received Signals," U.S. Appl. No. 14/557,275, 23 pages.
Office Action dated Aug. 28, 2014, for Reed, "Apparatus and Method of Energy Efficient Illumination," U.S. Appl. No. 14/329,508, 8 pages.
Office Action dated Aug. 31, 2016, for U.S. Appl. No. 14/869,501,Reed, "Asset Management System for Outdoor Luminaires," 15 pages.
Office Action dated Dec. 17, 2014, for Reed, "Luminaire With Ambient Sensing and Autonomous Control Capabilities," U.S. Appl. No. 13/786,332, 20 pages.
Office Action dated Dec. 21, 2012, for Reed et al., "Long-Range Motion Detection for Illumination Control," U.S. Appl. No. 12/784,080, 26 pages.
Office Action dated Dec. 22, 2014, for Reed et al., "Apparatus and Method of Operating a Luminaire," U.S. Appl. No. 13/558,191, 17 pages.
Office Action dated Dec. 5, 2012, for Reed, "Apparatus and Method of Energy Efficient Illumination," U.S. Appl. No. 12/784,091, 18 pages.
Office Action dated Dec. 5, 2012, for Reed, "Apparatus and Method of Energy Efficient Illumination," U.S. Appl. No. 12/784,093, 13 pages.
Office Action dated Feb. 17, 2017, for U.S. Appl. No. 14/939,856, Reed et al., "Luminaire With Adjustable Illumination Pattern," 13 pages.
Office Action dated Feb. 27, 2014, for Reed et al., "Adjustable Output Solid-State Lamp With Security Features," U.S. Appl. No. 13/679,687, 11 pages.
Office Action dated Jan. 30, 2014, for Reed et al., "Long-Range Motion Detection for Illumination Control," U.S. Appl. No. 12/784,080, 26 pages.
Office Action dated Jul. 22, 2013, for Reed et al., "Long-Range Motion Detection for Illumination Control," U.S. Appl. No. 12/784,080, 29 pages.
Office Action dated Mar. 15, 2013 for Reed et al., "Electrostatic Discharge Protection for Luminaire," U.S. Appl. No. 13/212,074, 11 pages.
Office Action dated Mar. 2, 2015, for Reed et al., "Apparatus and Method for Schedule Based Operations of a Luminaire," U.S. Appl. No. 14/552,274, 7 pages.
Office Action dated Mar. 26, 2014, for Reed et al., "Apparatus and Method for Schedule Based Operation of a Luminaire," U.S. Appl. No. 13/604,327, 10 pages.
Office Action dated Nov. 27, 2013, for Reed, "Apparatus and Method of Energy Efficient Illumination," U.S. Appl. No. 13/943,537, 8 pages.

(56) References Cited

OTHER PUBLICATIONS

Office Action dated Oct. 1, 2013, for Reed, "Apparatus and Method of Energy Efficient Illumination Using Received Signals," U.S. Appl. No. 13/085,301, 11 pages.
Office Action dated Sep. 19, 2016, for U.S. Appl. No. 14/552,274, Reed et al., "Apparatus and Method for Schedule Based Operation of a Luminaire," 9 pages.
Office Action, dated May 5, 2011, for Reed et al., "Low-Profile Pathway Illumination System," U.S. Appl. No. 12/437,472, 24 pages.
Panasonic Electronic Components, "LED Lighting Solutions," 2009, 6 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" Amendment filed Dec. 7, 2016, for U.S. Appl. No. 14/552,274, 11 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Amendment filed Jun. 7, 2016, for U.S. Appl. No. 14/552,274, 14 pages.
Reed et al., "Apparatus and Method of Operating a Luminaire," Amendment filed Mar. 19, 2015, for U.S. Appl. No. 13/558,191, 20 pages.
Reed et al., "Apparatus, Method to Change Light Source Color Temperature with Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement With Passive Cooling," U.S. Appl. No. 61/174,913, filed May 1, 2009, 29 pages.
Reed et al., "Gas-Discharge Lamp Replacement," U.S. Appl. No. 61/052,924, filed May 13, 2008, 32 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," U.S. Appl. No. 61/180,017, filed May 20, 2009, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," U.S. Appl. No. 61/641,781, filed May 2, 2012, 65 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 61/333,983, filed May 12, 2010, 57 pages.
Reed, "Asset Management System for Outdoor Luminaires," U.S. Appl. No. 14/869,501, filed Sep. 29, 2015, 57 pages.
Reed, "Asset Management System for Outdoor Luminaires," U.S. Appl. No. 62/082,463, filed Nov. 20, 2014, 56 pages.
Reed, "Centralized Control Area Lighting Hours of Illumination," U.S. Appl. No. 62/057,419, filed Sep. 30, 2014, 39 pages.
Reed, "Centralized Control of Area Lighting Hours of Illumination," Office Action dated Mar. 24, 2016 for U.S. Appl. No. 14/869,511, 31 pages.
Reed, "Detection and Correction of Faulty Photo Controls in Outdoor Luminaires," Notice of Allowance dated May 19, 2016 for U.S. Appl. No. 14/869,492, 9 pages.
Reed, "Detection and Correction of Faulty Photo Controls in Outdoor Luminaires," U.S. Appl. No. 14/869,492, filed Sep. 29, 2015, 71 pages.
Reed, "Detection and Correction of Faulty Photo Controls in Outdoor Luminaires," U.S. Appl. No. 62/068,517, filed Oct. 24, 2014, 47 pages.
Reed, "Detection and Correction of Faulty Photo Controls in Outdoor Luminaires," U.S. Appl. No. 62/183,505, filed Jun. 23, 2015, 71 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "High Efficiency Power Controller for Luminaire," U.S. Appl. No. 61/905,699, filed Nov. 18, 2013, 5 pages.
Reed, "Luminaire With Ambient Sensing and Autonomous Control Capabilities," Amendment filed Jul. 23, 2015, for U.S. Appl. No. 13/786,332, 17 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Notice of Allowance dated Aug. 6, 2015, for U.S. Appl. No. 13/786,332, 8 pages.
Reed, "Luminaire With Ambient Sensing and Autonomous Control Capabilities," Notice of Allowance dated May 4, 2016, for U.S. Appl. No. 14/950,823, 10 pages.
Reed, "Luminaire With Ambient Sensing and Autonomous Control Capabilities," Office Action dated May 29, 2015, for U.S. Appl. No. 13/786,332, 7 pages.

(56) References Cited

OTHER PUBLICATIONS

Reed, "Luminaire With Ambient Sensing and Autonomous Control Capabilities," U.S. Appl. No. 14/950,823, filed Nov. 24, 2015, 72 pages.

Reed, "Luminaire With Ambient Sensing and Autonomous Control Capabilities," U.S. Appl. No. 61/728,150, filed Nov. 19, 2012, 83 pages.

Reed, "Luminaire With Atmospheric Electrical Activity Detection and Visual Alert Capabilities," U.S. Appl. No. 61/649,159, filed Aug. 28, 2012, 52 pages.

Reed, "Luminaire With Switch-Mode Converter Power Monitoring," U.S. Appl. No. 61/723,675, filed Nov. 7, 2012, 73 pages.

Reed, "Photocontrol for Luminaire Consumes Very Low Power," U.S. Appl. No. 61/849,841, filed Jul. 24, 2013, 41 pages.

Reed, "Resonant Network for Reduction of Flicker Perception in Solid State Lighting Systems," U.S. Appl. No. 61/527,029, filed Aug. 24, 2011, 41 pages.

Reed, "Solid State Hospitality Lamp," U.S. Appl. No. 61/692,619, filed Aug. 23, 2012, 32 pages.

Reed, "Solid State Lighting, Drive Circuit and Method of Driving Same," U.S. Appl. No. 61/640,963, filed May 1, 2012, 24 pages.

Reed, "Systems, Methods, and Apparatuses for Using a High Current Switching Device as a Logic Level Sensor," U.S. Appl. No. 61/764,395, filed Feb. 13, 2013, 48 pages.

Reed, "Luminaire With Adjustable Illumination Pattern," U.S. Appl. No. 62/114,826, filed Feb. 11, 2015, 68 pages.

Renesas Electronics, "Zener Diodes for Surge Absorption—Applications of high-intensity LED," Apr. 2010, 1 page.

Renn et al., "Solid State Lighting Device and Method Employing Heat Exchanger Thermally Coupled Circuit Board," U.S. Appl. No. 61/357,421, filed Jun. 22, 2010, 49 pages.

Tyco Electronics, "Circuit Protection," retrieved Jun. 10, 2011, retrieved from http://www.tycoelectronics.com/en/products/circuit-protection.html, 2 pages.

Vendetti et al., "Systems and Methods for Controlling Luminaire Wireless Network Using Smart Appliance," U.S. Appl. No. 62/458,970, filed Feb. 14, 2017, 50 pages.

Vendetti et al., "Systems and Methods for Controlling Outdoor Luminaire Wireless Network Using Smart Appliance," U.S. Appl. No. 15/895,439, filed Feb. 13, 2018, 50 pages.

Written Opinion dated Nov. 11, 2014, for International Application No. PCT/US2014/047867, 5 pages.

Written Opinion, dated Dec. 13, 2010 for PCT/US2010/035649, 4 pages.

Written Opinion, dated Dec. 15, 2010 for PCT/US2010/035658, 3 pages.

Written Opinion, dated Dec. 28, 2010 for PCT/US2010/035651, 3 pages.

Written Opinion, dated Dec. 30, 2013 for PCT/US2013/058266, 8 pages.

Written Opinion, dated Feb. 26, 2014, for PCT/US2013/070794, 10 pages.

Written Opinion, dated Feb. 27, 2013, for PCT/US2012/065476, 8 pages.

Written Opinion, dated Jan. 14, 2013, for PCT/US2012/052009, 5 pages.

Written Opinion, dated Jul. 9, 2009 for PCT/US2009/043171, 8 pages.

Written Opinion, dated Jun. 21, 2010 for PCT/US2009/064625, 5 pages.

Written Opinion, dated Nov. 19, 2013 for PCT/US2013/052092, 7 pages.

Written Opinion, dated Oct. 8, 2012 for PCT/US2012/033059, 3 pages.

Written Opinion, dated Sep. 30, 2011, for PCT/US2011/021359, 4 pages.

* cited by examiner

SYSTEMS AND METHODS FOR OUTDOOR LUMINAIRE WIRELESS CONTROL

BACKGROUND

Technical Field

The present disclosure relates to illumination, and more particularly to control of illumination devices and systems.

Description of the Related Art

Luminaires enjoy widespread use in a variety of industrial, commercial, and municipal applications. Such applications can include general or area lighting of workspaces, roadways, parking lots, and the like. Multiple luminaires are typically arranged in patterns and positioned at intervals sufficient to provide a minimum overall level of illumination across the area of interest. For example, luminaires may be spaced at intervals along a driveway in a multilevel parking garage to provide an overall level of illumination that permits safe ingress and egress by pedestrians as well as permits safe operation of motor vehicles within the parking garage. In a similar manner, luminaires may be spaced at intervals throughout a commercial center parking lot to promote safe operation of motor vehicles, permit safe ingress and egress by customers, and foster a sense of safety and well-being for business patrons within the commercial center. Similarly, a number of luminaires may be spaced along a roadway to provide a level of illumination permitting safe operation of motor vehicles on the roadway and, where applicable, safe passage of pedestrians on sidewalks adjoining the roadway.

To simplify power distribution and control wiring, such luminaires may be organized into groups or similar hierarchical power and control structures. For example, multiple luminaires along a roadway may be grouped together on a common power circuit that is controlled using a single, centralized controller to collectively adjust the luminous output of all of the luminaires in the group. In another instance, multiple luminaires within a parking garage may be controlled using a single photocell mounted on the exterior of the parking garage. Such installations may however compromise operational flexibility for ease of installation and simplicity of operation.

Energy conservation has become of ever-increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, fluorescent lamps such as high-intensity discharge (HID) lamps (e.g., mercury vapor lamps, high-pressure sodium lamps, metal halide lamps).

There appears to be at least two primary approaches to reducing energy consumption associated with lighting systems. One approach employs higher efficiency light sources. The other approach selectively provides light only when needed.

Use of higher efficiency light sources may, for instance, include replacing incandescent lamps with fluorescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, fluorescent light sources may take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminated with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically by a control mechanism. Automatic control mechanisms generally fall into two broad categories, timers and environmental sensors. Timer based control mechanisms turn light sources ON and OFF based on time. The times are typically user configurable. Such relies on the user to account for changes or variations in the length of daylight in a 24 hour cycle which may occur throughout a year. Very often, timer based control mechanisms are set once and never updated.

Environmental sensor based control mechanisms sense light or illumination levels and/or motion or proximity. Light or illumination level based control mechanisms are commonly referred to as dusk-to-dawn sensors. Dusk-to-dawn light or illumination level based control mechanisms turn the light sources ON when a level of light or illumination in an environment falls below a turn ON threshold (i.e., dusk threshold), and turn the light sources OFF when the level of light or illumination exceeds a turn OFF threshold (i.e., dawn threshold). Light or illumination level based control subsystems advantageously automatically accommodate changes in length of day light throughout the year.

Example outdoor lighting systems may include a number of individual luminaires mounted on poles and that are each controlled by a photocontrol (or other mechanism) that controls the AC power to the luminaire for daytime and nighttime operation. This is often accomplished through a standard wired 3-pin twist-lock receptacle (e.g., ANSI C136.10 compliant receptacle) on the luminaire that mates with a compatible photocontrol plug interface (e.g., ANSI C136.10 compliant plug). The photocontrol switches the luminaire power ON/OFF based on the dusk/dawn events. There are also scenarios where groups of luminaires are controlled together by an AC contactor that activates power to the group as a whole, and controlled by a photocontrol, timer, etc.

More elaborate lighting networks may cover a large area, such as a city, and may include numerous individual luminaires outfitted with network communication nodes that can each be controlled by a remotely located central management system (CMS). Communication between the luminaires and the CMS may be enabled through mesh or mobile wireless networks, or through powerline communications. The network nodes may additionally offer more capabilities to control the luminaires, such as dimming to specific levels and varying illumination with time, metering of the power being consumed by the luminaire, maintenance alerts regarding luminaire failure or malfunction, and ability to commission and/or decommission the luminaires remotely.

BRIEF SUMMARY

A wireless adapter system may be summarize as including: an adapter system physical luminaire interface that is physically coupleable to a physical luminaire interface of a luminaire to receive alternating current (AC) power from the luminaire; a first adapter system transceiver that in operation wirelessly communicates with a luminaire transceiver of the luminaire; at least one processor communicatively coupled to the first adapter system transceiver; and at least one nontransitory processor-readable storage medium operatively coupled to the at least one processor and storing at least one of data or instructions which, when executed by the at least one processor, cause the at least one processor to: cause the first adapter system transceiver to at least one of: wirelessly send data or instructions to the luminaire; or wirelessly receive data or instructions from the luminaire.

The adapter system physical luminaire interface may include a 3-wire interface comprising an AC line connection, an AC neutral connection, and an AC switched line connection. The adapter system physical luminaire interface may include a twist lock plug. The adapter system physical luminaire interface may be selectively physically coupleable to a control node physical node interface of a control node in an integrated housing.

The wireless adapter system may include an adapter system physical node interface that is selectively physically coupleable to a control node physical node interface of a control node. The adapter system physical node interface may include one of a 5-pin receptacle interface or a 7-pin receptacle interface. In operation, the adapter system physical node interface may provide AC power from the physical luminaire interface of the luminaire to the control node physical node interface of the control node. In operation, the adapter system physical luminaire interface may couple an AC line connection, a neutral connection, and a switched line connection of the luminaire to the control node physical node interface of the control node. In operation, the adapter system physical node interface may enable power switching to and power measurement of the luminaire by the control node.

The at least one processor of the wireless adapter system may: receive, via the adapter system physical node interface, at least one of instructions or data; and cause the first adapter system transceiver to wirelessly send the received at least one of instructions or data to the luminaire in a format that is readable by the luminaire. The at least one processor may: receive, via the adapter system transceiver, at least one of instructions or data from the luminaire; and send, via the adapter system physical node interface, the received at least one of instructions or data to the control node. The at least one processor may include at least one of an analog dimming receiver or a digitally addressable lighting interface (DALI) transceiver. The adapter system physical luminaire interface, adapter system physical node interface, and the first adapter system transceiver may all be disposed in an adapter system housing.

The wireless adapter system may include a second adapter system transceiver that in operation communicates wirelessly with an external device over a wireless network. The at least one processor may: receive, via the second adapter system transceiver, at least one of instructions or data; and cause the first adapter system transceiver to wirelessly send the received at least one of instructions or data to the luminaire in a format that is readable by the luminaire. The at least one processor may: receive, via the first adapter system transceiver, at least one of instructions or data from the luminaire; and send, via the second adapter system transceiver, the received at least one of instructions or data to an external device over at least one communications network.

A method of operating a luminaire may be summarized as including: providing a wireless adapter system comprising an adapter system physical luminaire interface, a first adapter system transceiver, and at least one processor communicatively coupled to the first adapter system transceiver; physically coupling the adapter system physical luminaire interface of the wireless adapter system to a luminaire physical node interface of a luminaire to receive alternating current (AC) power from the luminaire; and causing, by the at least one processor, the first adapter system transceiver to at least one of wirelessly send data or instructions to the luminaire or wirelessly receive data or instructions from the luminaire.

The adapter system physical luminaire interface may include a 3-wire interface comprising an AC line connection, an AC neutral connection, and an AC switched line connection, and physically coupling the adapter system physical luminaire interface of the wireless adapter system to a luminaire physical node interface may include physically coupling the AC line connection, the AC neutral connection, and the AC switched line connection to circuitry of the luminaire. The adapter system physical luminaire interface may include a twist lock plug and physically coupling the adapter system physical luminaire interface of the wireless adapter system to a luminaire physical node interface may include physically coupling the twist lock plug to a receptacle of the luminaire. The adapter system physical luminaire interface may be selectively physically coupleable to a control node physical node interface of a control node in an integrated housing.

The wireless adapter system may include an adapter system physical node interface, and the method may further include physically coupling the adapter system physical node interface to a control node physical node interface of a control node. The adapter system physical node interface may include one of a 5-pin receptacle interface or a 7-pin receptacle interface, and physically coupling the adapter system physical node interface to a control node physical node interface of a control node may include physically coupling the one of a 5-pin receptacle interface or the 7-pin receptacle interface to a plug of the control node. The method may include providing, via the adapter system physical luminaire interface, AC power from the physical luminaire interface of the luminaire to the control node physical node interface of the control node. The method may include receiving, by the at least one processor via the adapter system physical node interface, at least one of instructions or data; and causing, by the at least one processor, the first adapter system transceiver to wirelessly send the received at least one of instructions or data to the luminaire in a format that is readable by the luminaire. The method may include receiving, by the at least one processor via the first adapter system transceiver, at least one of instructions or data from the luminaire; and sending, by the at least one processor via the adapter system physical node interface, the received at least one of instructions or data to the control node.

The wireless adapter system may include a second adapter system transceiver, and the method may further include communicating, via the second adapter system transceiver, wirelessly with an external device over a wireless network. The method may include receiving, by the at least one processor via the second adapter system transceiver, at least one of instructions or data; and causing, by the at least one processor, the first adapter system transceiver to wirelessly send the received at least one of instructions or data to the luminaire in a format that is readable by the luminaire. The method may include receiving, by the at least one processor via the first adapter system transceiver, at least one of instructions or data from the luminaire; and sending, by the at least one processor via the second adapter system transceiver, the received at least one of instructions or data to an external device over at least one communications network.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
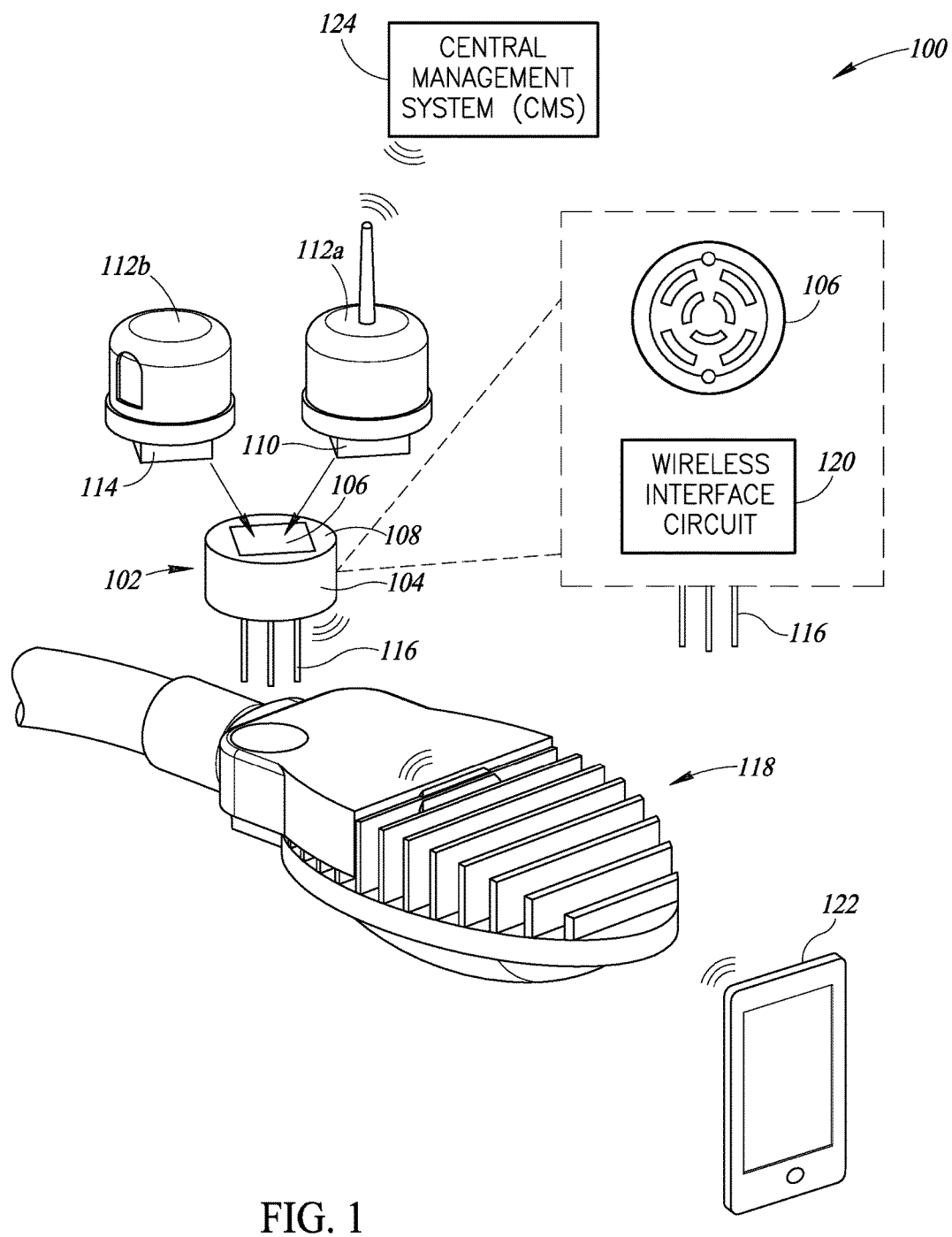
FIG. 1 is a pictorial diagram of an illumination system that includes a wireless adapter system, according to at least one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

More elaborate lighting networks may cover a large area, such as a park, highway, or city, and may include numerous individual luminaires outfitted with network communication nodes or "lamp control nodes" that can each be controlled by a remotely located central management system (CMS). Communication between the luminaires and the CMS may be enabled through mesh or mobile wireless networks, or through powerline communications. In addition to photo-control capability, the lamp control nodes may additionally offer more capabilities to control the luminaires, such as dimming to specific levels and varying illumination with time, metering of the power being consumed by the luminaire, maintenance alerts regarding luminaire failure or malfunction, and ability to commission and/or decommission the luminaires remotely.

These extended capabilities are accomplished through an expanded version of the three wire twist-lock receptacle that includes more interface pins (e.g., 5 or 7 total pins) and wires for dimming control and for reading status signals from the luminaire. This expanded version is described in the ANSI C136.41 standard. The extra pins or pads allow dimming through a standard 0-10 V analog interface or through a digital lighting protocol referred to as Digitally Addressable Lighting Interface (DALI) that typically interfaces to the power control electronics in the luminaire. The extra control lines usually route to specialized lighting drivers of the luminaire that recognize the specific control input appropriately.

A problem arises when an existing street light luminaire is being upgraded in the field to the 5-pin or 7-pin (e.g., ANSI C136.41) network control capabilities from the traditional 3-pin interface (e.g., ANSI C136.10). At a minimum, the 3-pin receptacle on the luminaire needs to be replaced by the 5-pin or 7-pin version and the wires connected appropriately. In most cases, the existing driver electronics for the lighting of the luminaire have no connections available for the extra control lines from the receptacle unless the driver was originally specified to be a more advanced model. The result is that the driver of the luminaire is also replaced and is likely a major percentage of the cost of the entire luminaire, not including the labor involved in the replacement. This would be a normal scenario in upgrading many of the already-deployed LED street and roadway luminaires to date, as the network control rollouts are in their infancy with few deployed.

The problem is compounded for decorative post top street and area lights, most of which have not yet converted to LED lighting. The majority of these post top lights have internal electronics housed at the base of the light fixture or at the base of the pole. They often include the standard 3-pin receptacle and photocontrol either on top of the post top fixture, or tucked away inside with the other electronics with a peep hole for the photocontrol sensor. In this scenario, the only viable solution for upgrading the luminaire to LED lighting and including the ability to support the 5-pin or 7-pin control node is to replace the entire luminaire with a modern unit. This can be very expensive, especially for highly ornate fixtures, and it may be impossible to duplicate the look of older, historical luminaires with modern replacements.

One or more implementations of the present disclosure provide systems, methods and articles which leverage the wireless communication capability present in wireless-enabled luminaires where the lamps include a short-range wireless transceiver (e.g. Bluetooth® transceiver) and can be controlled by a smart appliance, such as a smartphone, tablet computer, laptop computer, etc. In at least some implementations, the wireless capability embedded in the luminaire may be paired with a second compatible wireless interface to standard plug-in photocontrols and wireless lamp control nodes, or any wireless-enabled control device of any form factor within proximity of the luminaire.

In at least some implementations, a wireless adapter system may be provided that replaces the standard 3-pin, 5-pin or 7-pin wired receptacle. The wireless adapter system may include a 3-wire interface (e.g., line, neutral, switched line) to the luminaire which provides power to the wireless adapter system. The wireless adapter system may include a receptacle interface (e.g., 5-pin, 7-pin) that receives a plug (e.g., 3-pin, 5-pin, 7-pin) of a control device, such as photocontrol or a networked control node. The wireless adapter system may also include a wireless interface circuit that communicates control, status or other data between the connected control device and the luminaire. In at least some implementations, the wireless interface circuit may replace some or all of the control lines from any control device while offering the same capabilities available to the smart appliance.

FIG. 1 shows an illumination system 100 which includes a wireless-enabled adapter system 102 of the present disclosure. The adapter system 102 includes a housing 104 that includes a receptacle interface 106 on a top surface 108 thereof. As a non-limiting example, the receptacle interface 106 may be a 5-pin or a 7-pin receptacle interface (e.g., ANSI C146.41) that receives a 5-pin or 7-pin plug 110 of a networked control node 112a or 3-pin plug 114 of a standard photocontrol 112b, collectively referred to herein as control nodes 112. The adapter system 102 includes a 3-wire interface 116 (or physical node interface) that may be electrically coupled to circuitry of a luminaire 118, thereby replacing a standard 3-wire luminaire receptacle of the luminaire. The luminaire 118 may comprise an AreaMax™ LED area lighting fixture available from Evluma of Renton, Wash., for example. The 3-wire interface 116 provides AC power from the luminaire 118 to the adapter system 102, and also provides AC power to the control node 112 (e.g., the photocontrol 112b, the networked control node 112a) coupled to the receptacle interface 106 of the wireless-enabled adapter system 102. The wires of the 3-wire interface 116 may include line, neutral, and a switched line, for example.

The wireless adapter system 102 also includes a short-range wireless interface circuit 120 (e.g., Bluetooth®, WiFi) disposed in the housing 104. In operation, the wireless adapter system 102 receives via the wired receptacle interface 106 ON/OFF, dimming, or other commands or data from the control node 112 and autonomously interprets or translates those signals using one or more processors, for example. The received interpreted signals are translated into wireless signals that are transmitted by the wireless interface circuit 120 of the adapter system 102 and received by the wireless-enabled luminaire 118. Similarly, the adapter system 102 may receive via the wireless interface circuit 120 signals encoding data or instructions from the luminaire 118, and may interpret and transmit the signals to the control node 112 via the wired receptacle interface 106. The instructions or commands may be in the form of switch-controlled ON/OFF signals, analog dimming with dim-to-off capability (e.g., 0-10 V), digital control and status commands (e.g., DALI), or any other types of signals.

As noted above, the luminaire 118 may contain one or more short-range wireless network interfaces (e.g., Bluetooth®, WiFi) that allow the luminaire to communicate with a mobile system 122 disposed proximate (e.g., within 150 meters, within 100 meters, within 50 meters) the luminaire. Although only one luminaire is shown for explanatory purposes, it should be appreciated than in practice some applications may have a plurality of luminaires (e.g., 2 luminaires, 100 luminaires, 1000 luminaires).

The control node 112a may communicate instructions and/or data with a central management system (CMS) 124 via a network. As an example, the mobile system 122 may communicate with the CMS 124 via an access point (e.g., cellular tower, WIFI® access point) communicatively coupled to the CMS via one or more suitable data communications networks (e.g., mobile telecommunications network(s), Internet).

Figure 2:
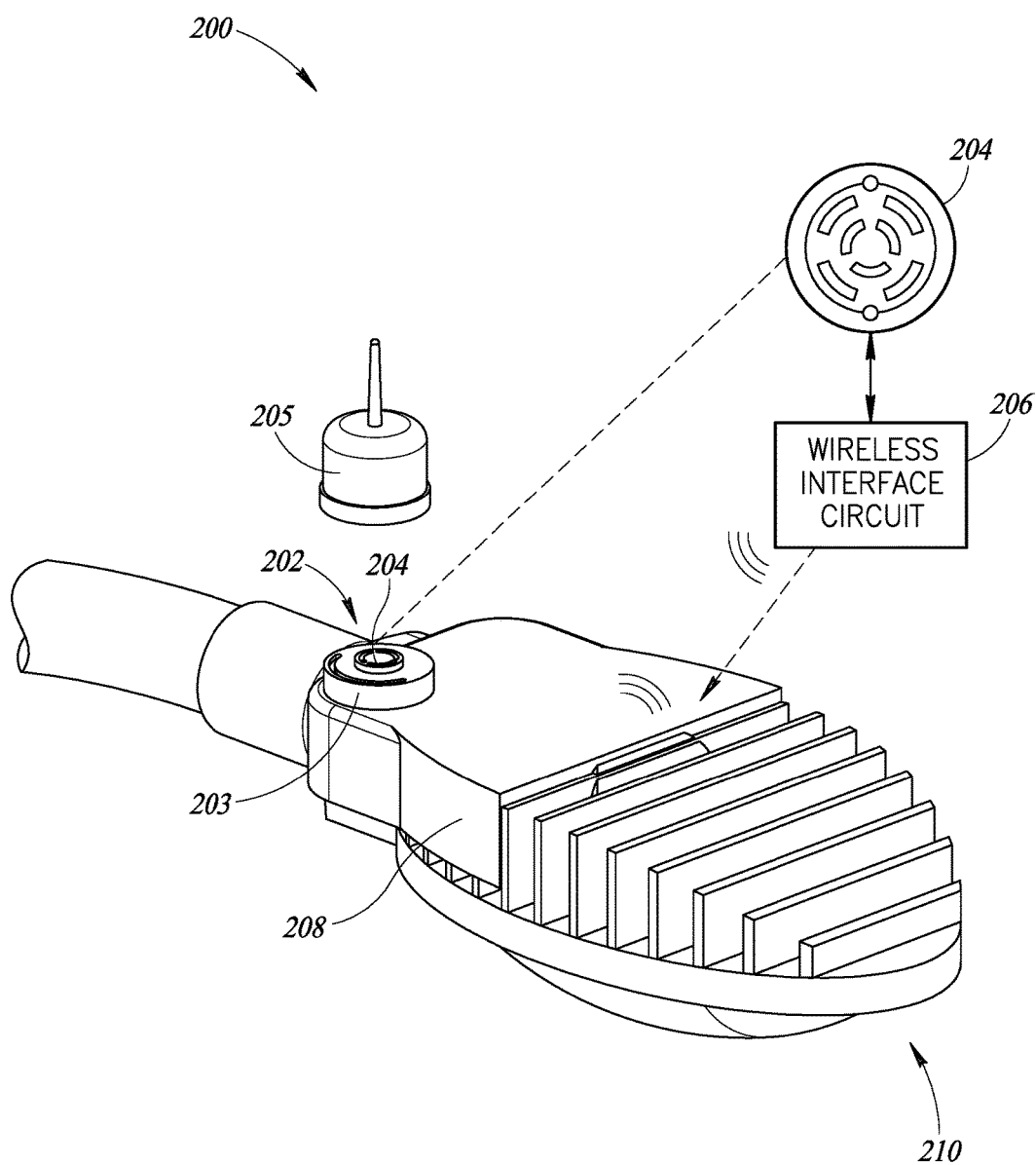
FIG. 2 is a pictorial diagram of an illumination system that includes a wireless adapter system having a receptacle interface disposed in an adapter system housing and a wireless interface circuit disposed in a housing of a luminaire, according to one illustrated implementation.

In the implementation shown in FIG. 1, the wireless-enabled adapter system 102 includes the wired receptacle interface 106 and the wireless interface circuit 120 in the single housing 104. FIG. 2 shows an implementation of an illumination system 200 that includes a wireless-enabled adapter system 202 that is implemented as two or more discrete entities comprising a wired receptacle interface 204 (e.g., 5-pin, 7-pin) disposed within a housing 203 of the adapter system 202 and a wireless interface circuit 206 positioned within a housing 208 of a wireless-enabled luminaire 210. In this implementation, the wired receptacle interface 204 includes a receptacle interface (e.g., 5-pin, 7-pin) that selectively receives a plug of a control node 205 (e.g., networked control node, photocontrol). The wired receptacle interface 204 is coupled to a 3-wire interface that connects to a circuit board in the luminaire housing 208, and the wireless interface circuit 206 wirelessly communicates with a wireless module of the wireless-enabled luminaire 210 inside the luminaire housing 208. Thus, the functionality of the wireless adapter system 102 of FIG. 1 is achieved without requiring the wireless interface circuit 206 (or other circuitry) to be disposed in the housing 203 of the adapter system 202, thereby allowing the housing 203 of the adapter system 202 to be smaller than the housing 104 of the adapter system 102 of FIG. 1.

Figure 3A:
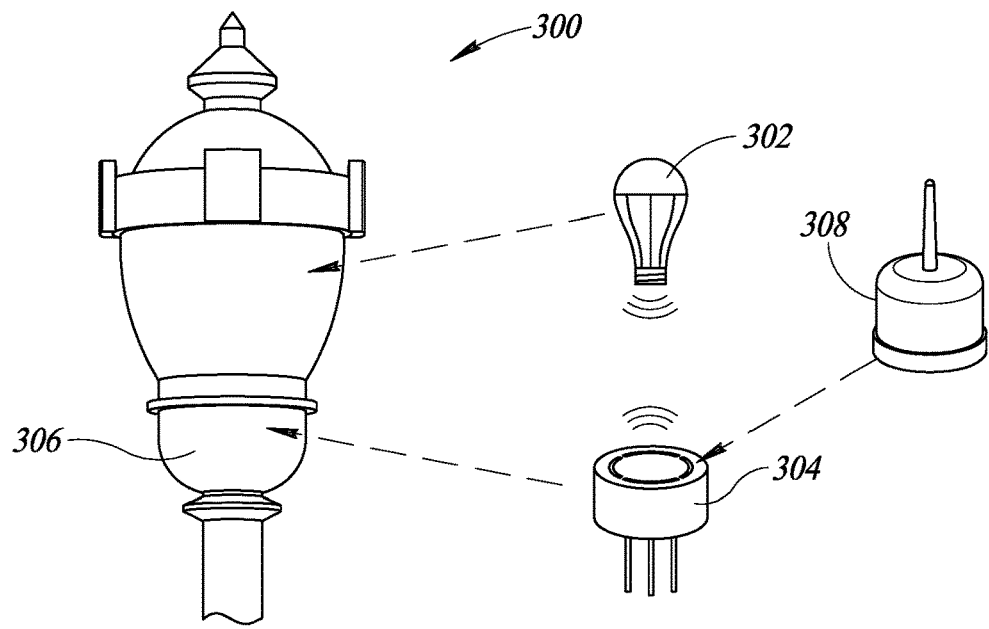
FIG. 3A is a pictorial diagram of a post top luminaire fixture that includes a wireless LED bulb therein and a wireless-enabled adapter system disposed inside a housing of the fixture, according to one illustrated implementation
Figure 3B:
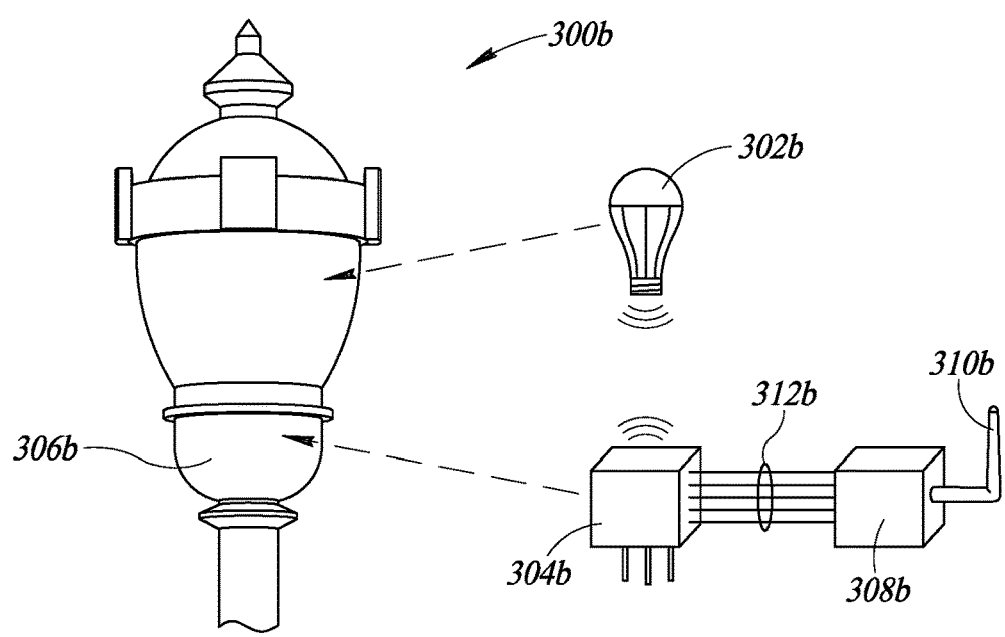
FIG. 3B is a pictorial diagram of a post top luminaire fixture that includes a wireless LED bulb there and a wireless-enabled adapter system disposed inside a housing of the fixture that is hardwired to a control node, according to one illustrated implementation.
Figure 4:
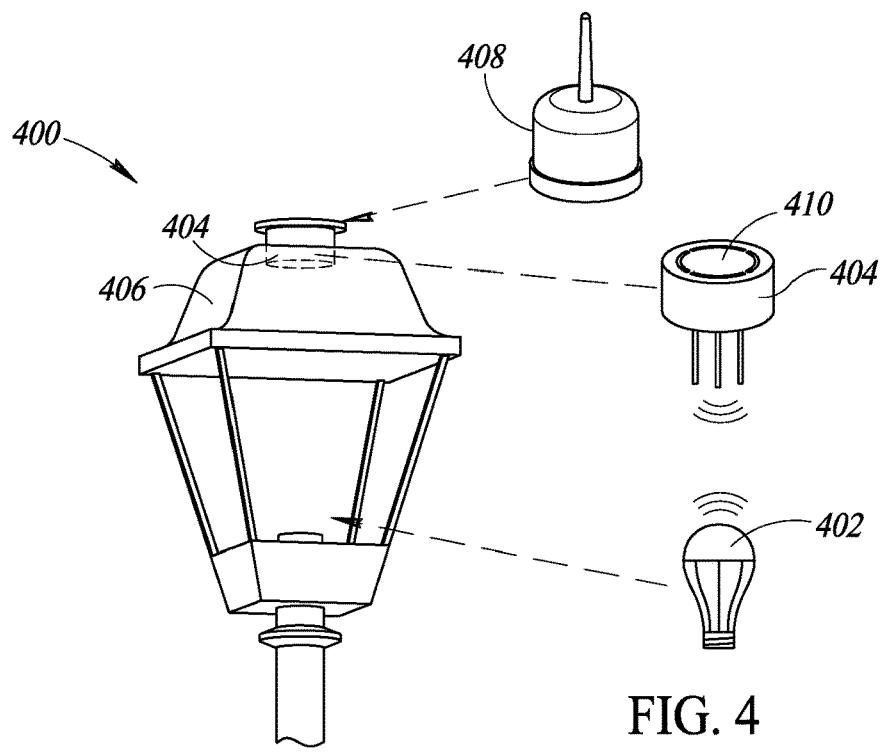
FIG. 4 is a pictorial diagram of a post top luminaire fixture that includes a wireless LED bulb and a wireless-enabled adapter system disposed on a top portion of a housing of the fixture, according to one illustrated implementation.
Figure 5:
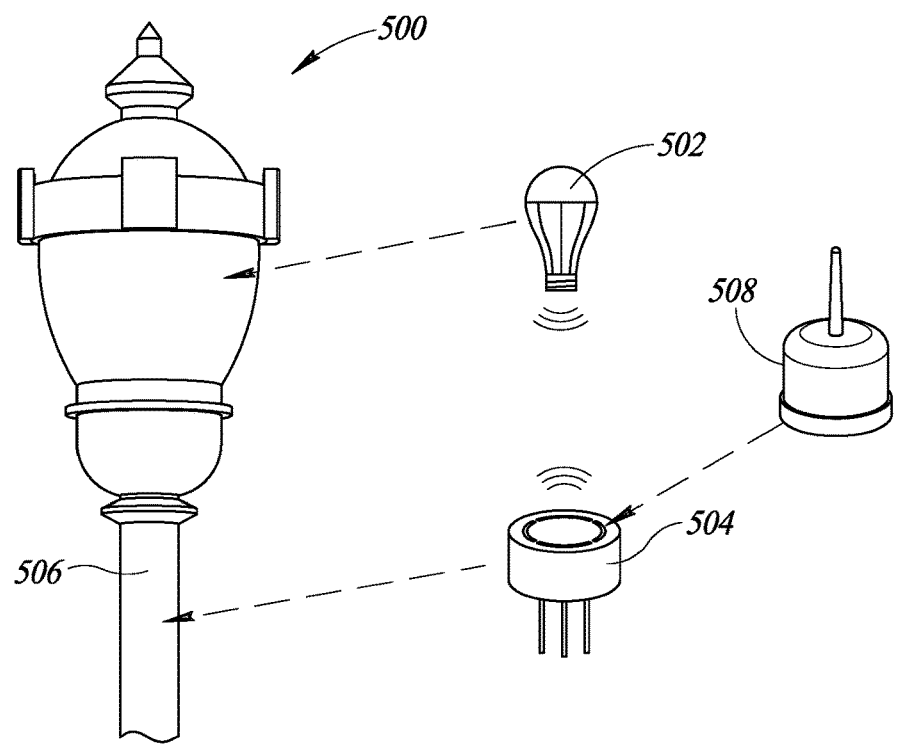
FIG. 5 is a pictorial diagram of a post top luminaire fixture that includes a wireless LED bulb and a wireless adapter system that is mounted to a pole that supports the fixture, according to one illustrated implementation.

FIGS. 3-5 show various mounting options for the wireless adapter systems of the present disclosure in decorative post top luminaires. In particular, FIG. 3A shows a post top luminaire fixture 300 that includes a wireless LED bulb 302 therein and a wireless-enabled adapter system 304 disposed inside a housing 306 of the fixture 300. A control node 308 is shown being connected to the wireless-enabled adapter system 304. FIG. 3B shows a post top luminaire fixture 300b that includes a wireless LED bulb 302b therein and a wireless-enabled adapter system 304b disposed inside a housing 306b of the fixture 300b. A control node 308b that includes an external antenna 310b is shown with a hardwired connection 312b to the wireless-enabled adapter system 304b instead of a plug-in node. FIG. 4 shows a post top luminaire fixture 400 that includes a wireless LED bulb 402 and a wireless-enabled adapter system 404 disposed on a top portion of a housing 406 of the fixture 400. A control node 408 is shown as being connected to a receptacle interface 410 of the wireless-enabled adapter system 404. FIG. 5 shows a post top luminaire fixture 500 that includes a wireless LED bulb 502 and a wireless adapter system 504 that is mounted to a pole 506 that supports the luminaire fixture 500. A control node 508 is shown being connected to the wireless-enabled adapter system 504. As a non-limiting example, the wireless LED bulbs 302, 402 and/or 502 may each comprise an OmniMax™ LED area lighting fixture available from Evluma of Renton, Wash. In each of the examples shown in FIGS. 3-5, a control node (e.g., networked control node, photocontrol) may be coupled to the adapter system (e.g., adapter systems 304, 404 or 504) to provide the functionality discussed herein.

Figure 6:
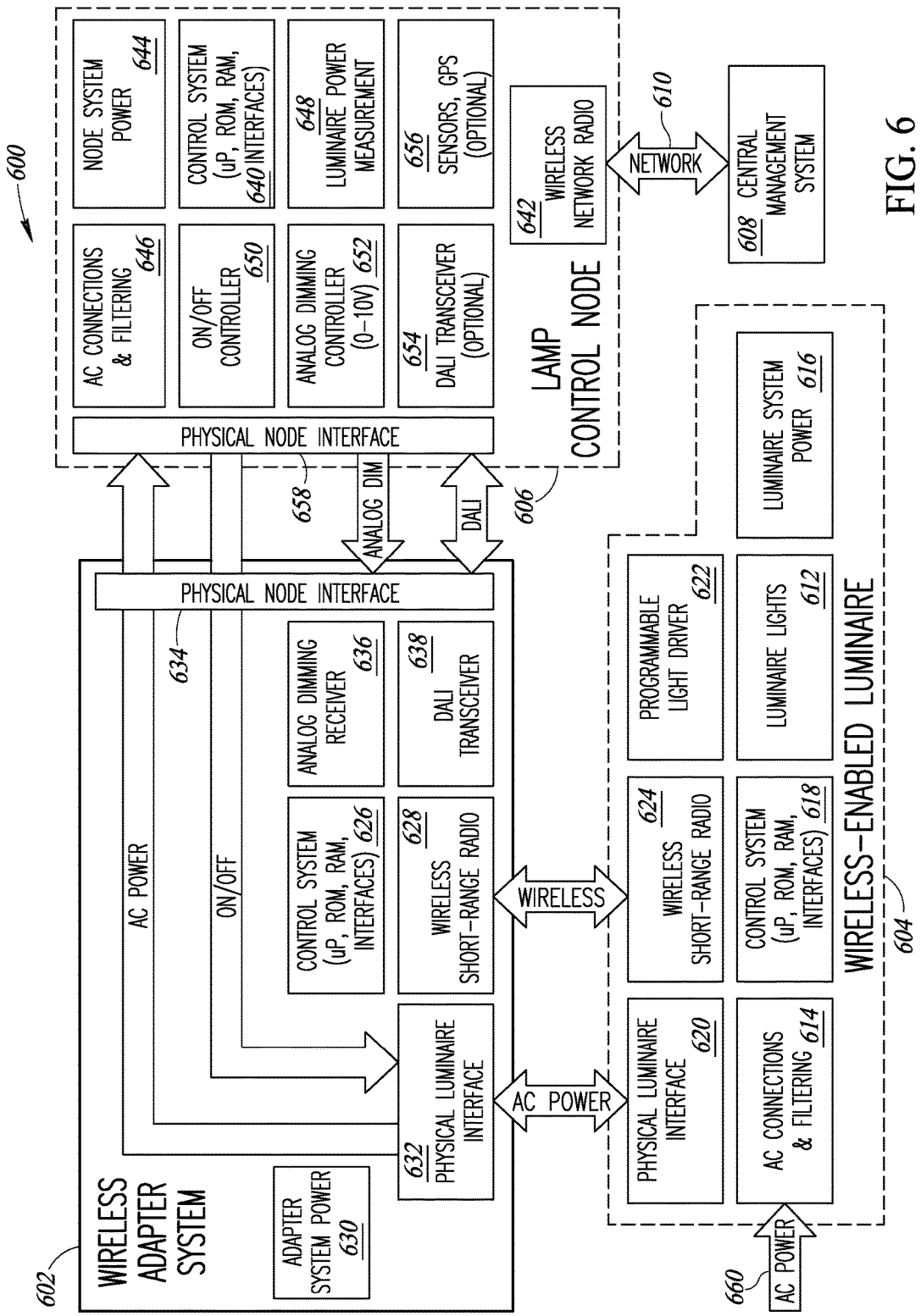
FIG. 6 is a functional block diagram of a wireless adapter system, a wireless-enabled luminaire, and a control node, according to at least one illustrated implementation.

FIG. 6 shows a schematic block diagram of an illumination system 600 that includes a wireless-enabled adapter system 602 coupled to a wireless-enabled luminaire 604 and coupled to a networked lamp control node 606. The networked lamp control node 606 may communicate via a suitable network 610 (e.g., mobile network) with a central management system (CMS) 608. FIG. 6 and the following discussion provide a brief, general description of the components forming the illustrative illumination system 600 in which the various illustrated implementations can be practiced. Although not required, some portion of the implementations will be described in the general context of computer-executable instructions or logic and/or data, such as program application modules, objects, or macros being executed by a computer. Those skilled in the relevant art will appreciate that the illustrated implementations as well as other implementations can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The implementations can be practiced in distributed computing environments where tasks or modules are performed by remote processing devices, which are linked through a communications network. In a distributed computing environment, program modules may be located in both local and remote memory storage devices.

The luminaire 604 may include one or more light sources 612 (e.g., LEDs), AC connections and filtering circuitry 614, a power supply system 616, a control system 618 (e.g., one or more processors, RAM, ROM, buses, interfaces), a physical luminaire interface 620, a programmable light driver 622, and a wireless short-range radio or transceiver 624 which communicates via a wireless communications protocol (e.g., Bluetooth®).

The wireless adapter system 602 may include a control system 626, a wireless short-range radio or transceiver 628, a power supply system 630, a physical luminaire interface 632, a physical node interface 634, an analog dimming receiver 636, and a DALI transceiver 638.

The lamp control node 606 may include a control system 640, a wireless network radio or transceiver 642, a power supply system 644, AC connections and filtering circuitry 646, a luminaire power measurement module 648, an ON/OFF controller 650, an analog dimming controller 652, an optional DALI transceiver 654, optional sensors and/or a GPS receiver 656, and a physical node interface 658.

The AC connections and filtering circuitry 614 of the luminaire 604 may be electrically coupled with a power distribution system 660. The AC connections and filtering circuitry 614 may receive an AC power signal from the power distribution system 660, and the power supply system 616 may generate a DC power output from the AC power input to system components of the luminaire 604. The programmable light driver 622 may supply the generated DC power output to the light sources 612 to power the light sources. The light sources 612 may include one or more of a variety of conventional light sources, for example, incandescent lamps or fluorescent lamps such as high-intensity discharge (HID) lamps (e.g., mercury vapor lamps, high-pressure sodium lamps, metal halide lamps). The light sources may also include one or more solid-state light sources (e.g., light emitting diodes (LEDs), organic LEDs (OLEDs), polymer LEDs (PLEDs)).

The control systems 618, 626 and/or 640 may each include one or more logic processing units, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 6 are of conventional design. As a result, such blocks need not be described in further detail herein, as they will be understood by those skilled in the relevant art. The control systems 618, 626 and/or 640 may utilize a system bus that employs any known bus structures or architectures. The control systems 618, 626 and/or 640 may include system memory that includes read-only memory ("ROM") and/or random access memory ("RAM"). The control systems 618, 626 and/or 640 also may include one or more drives for reading from and writing to one or more nontransitory computer- or processor-readable media (e.g., hard disk, magnetic disk, optical disk). The drive may communicate with one or more processors via a system bus. The drive may include interfaces or controllers coupled between such drives and a system bus, as is known by those skilled in the art. The drives and their associated nontransitory computer- or processor-readable media provide nonvolatile storage of computer-readable instructions, data structures, program modules and other data for the control systems. Those skilled in the relevant art will appreciate that other types of computer-readable media may be employed to store data accessible by a computer.

The physical luminaire interface 632 of the wireless adapter system 602 may be a 3-wire interface (line, neutral, switched line) that connects to the physical luminaire interface 620 (e.g., circuit board) of the luminaire 604. The physical node interface 634 may be a 5-pin or 7-pin receptacle interface (e.g., ANSI C146.41 compliant receptacle) that mates with the physical node interface 658 (e.g., ANSI C146.41 compliant plug) of the lamp control node 606.

In operation, the lamp control node 606 receives power from the luminaire 604 via the adapter system 602, and sends an ON/OFF signal to the luminaire via the physical luminaire interface 632 (e.g., via the switched line of the 3-wire interface). The wireless adapter system 602 also receives or transmits analog dimming signals and/or DALI signals to and from the lamp control node 606 via the physical connection between the physical node interface 634 of the adapter system 602 and the physical node interface 658 of the lamp control node 606. The signals received by the analog dimming receiver 636 (or transceiver) or the DALI transceiver 638 may be processed (e.g., translated, interpreted, decoded) into a wireless format that may be sent wirelessly to the luminaire 604. More generally, the wireless adapter system 602 may communicate with the lamp control node 606 via the physical node interfaces 634 and 658, and may communicate such information or data with the luminaire 604 via the wireless short-range radios 624 and 628. Thus, the luminaire 604 may utilize the added functionality provided by the lamp control node 606.

Advantageously, the wireless adapter systems discussed above may be added to a wireless-enabled luminaire replacing a 3-pin receptacle originally controlled by a basic photocontrol for dusk and dawn transitions. Such allows the photocontrol to be replaced by an enhanced 7-pin lamp control node to provide all of the extended control and status capabilities in the luminaire to be managed by a remote CMS with no other changes to the luminaire. This saves the cost and labor of also replacing an incompatible driver of the luminaire that does not support the enhanced control capabilities of the control node.

Additionally, for decorative post top luminaires (see FIGS. 3-5), the implementations discussed above enable an upgrade from traditional HID bulbs to more energy efficient and long-lasting LED bulb retrofits that are wirelessly enabled. The wireless 7-pin adapter systems can also replace any existing 3-pin receptacle to enable the addition of a networked lamp control node. The resulting combination is significantly less expensive than replacing the entire fixture or replacing all of the electronics with a custom retrofit assembly. Further, if a 3-pin receptacle is housed inside the luminaire housing, an external antenna on the wireless controller may be all that is required. Additionally, if the luminaire has no existing 3-pin receptacle, a wireless 7-pin adapter system may be added on a bracket internally or externally and wired to the appropriate power lines.

In both of the above cases, the luminaire maintains the capability to interface to a smart appliance through the wireless interface. This provides a backup or alternative solution to the wireless network interface should the control node or network fail and the luminaire's settings need to be adjusted.

Figure 7:
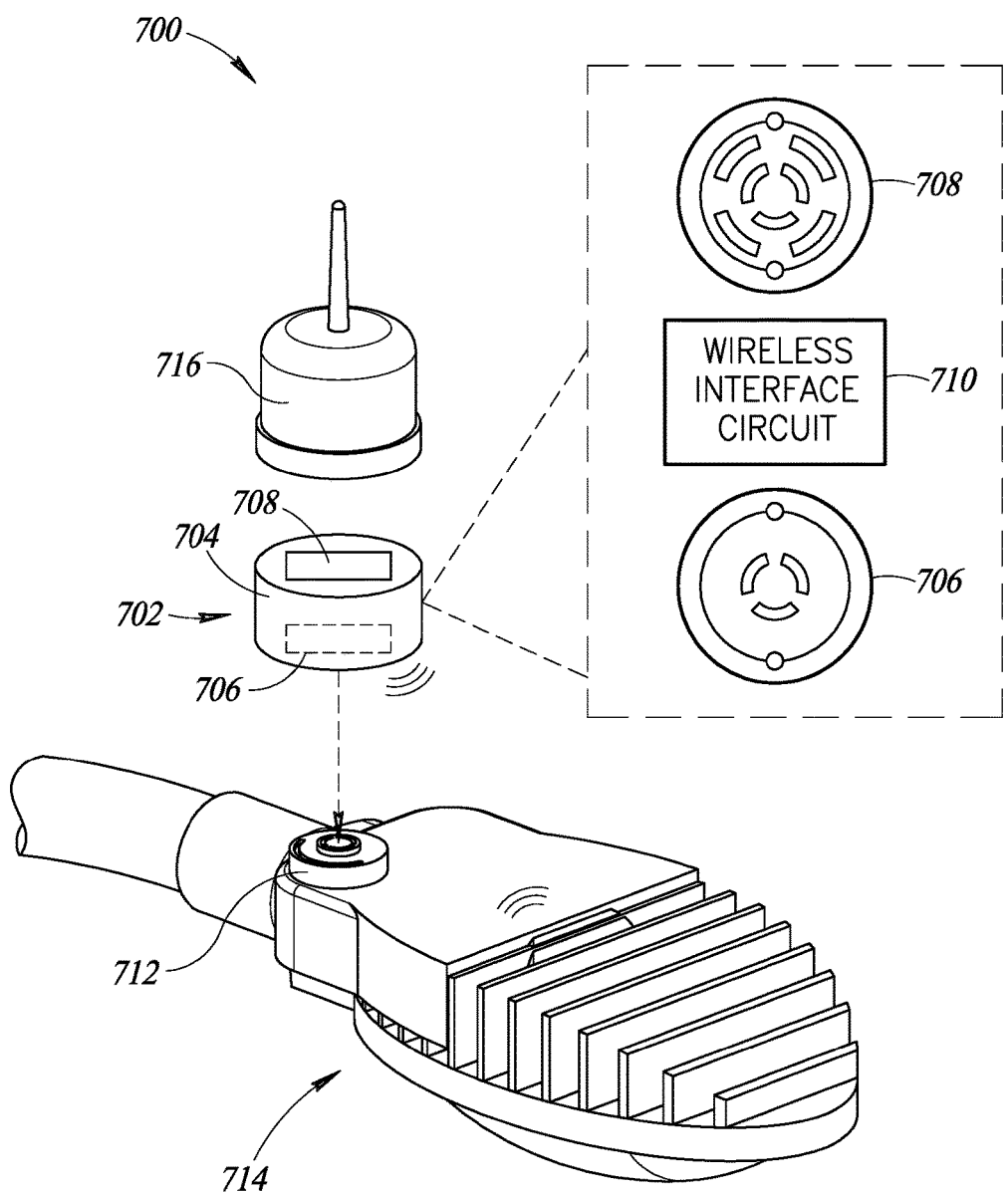
FIG. 7 is a pictorial diagram of an illumination system that includes a wireless adapter that is selectively coupleable to a luminaire and a control node, according to one illustrated implementation.

FIG. 7 shows another implementation of an illumination system 700 that includes a wireless adapter 702 that includes a housing 704 that includes a 3-pin plug 706 on a bottom surface thereof and a 5-pin or 7-pin receptacle 708 on a top surface thereof. The housing 704 of the wireless adapter 702 also includes a wireless interface circuit 710 and other components (e.g., control system, power management, dimming receiver, DALI transceiver) as discussed above with reference to the adapter system 602 of FIG. 6. The 3-pin plug 706 plugs into an existing 3-pin receptacle 712 of a wireless-enabled luminaire 714 and converts the luminaire to a 5 or 7-pin receptacle, eliminating the 3-wire interface control limitations on the receptacle 712 of the luminaire. The wireless adapter 702 provides the 7-pin-compatible receptacle 708 for any traditional 3/5/7 pin control node 716 to plug into the luminaire 714. The wireless adapter 702 may convert 0-10 V dimming commands, and/or DALI commands and status to the equivalent wireless commands that may be transmitted to the luminaire 714. Power for the control node 716 may also be provided from the luminaire 714 through plug 706 and receptacle 708 the wireless adapter 702. Advantageously, no physical modification or rewiring of the luminaire 714 or control node 716 is required.

The functional blocks for the wireless adapter 702 may be similar or identical to the wireless adapter system 602 shown in FIG. 6. In this implementation, the physical luminaire interface 632 comprises a standard 3-pin plug (e.g., standard twist lock plug) rather than a 3-wire interface. The 3-pin plug physically connects to the physical luminaire interface 620 of a luminaire, which in this implementation is the standard 3-pin receptacle of the luminaire. In addition to the advantages of the wireless adapter systems discussed above, in this implementation the wireless adapter 702 provides a simple plug-in adapter requiring no additional wiring or connections in the luminaire 714.

Figure 8:
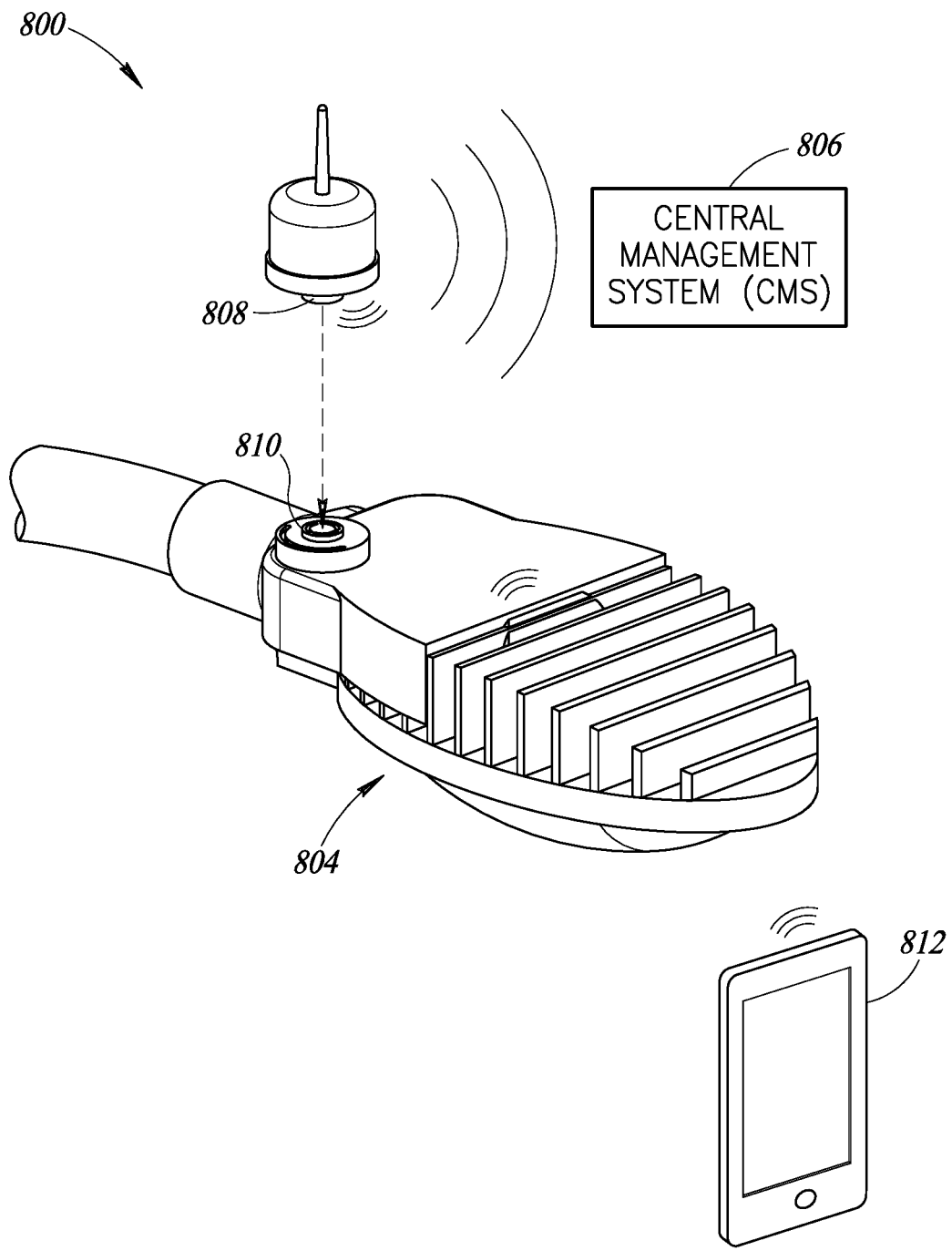
FIG. 8 is a pictorial diagram of an integrated lamp control node, according to one illustrated implementation.

FIG. 8 shows another implementation of an illumination system 800 that includes an integrated lamp control node 802 that contains both a short-range wireless radio (e.g., Bluetooth® radio) and a wireless network radio (e.g., cellular network radio) operating together to enable control of a luminaire 804 from a remote central management system (CMS) 806 or other external device. The integrated lamp control node 802 includes a plug 808 that plugs into a 3-pin or 7-pin receptacle 810 on the luminaire 804 for physical mounting of the node 802 and to also obtain AC power from the luminaire. The control of the luminaire 804, however, is accomplished via short range wireless signals through a connection between the control node 802 and the wireless-enabled luminaire 804. All commands initiated to the control node 802 via the wireless network radio from the CMS 806 over the wireless network are sent to the luminaire 804 over the short range wireless connection. Similarly, all response information is returned to via the short range wireless interface from the luminaire 804 to the control node 802 and returned to the CMS 806 over the wireless network. The luminaire 806 can still also be controlled by a smart appliance 812, as discussed above.

Figure 9:
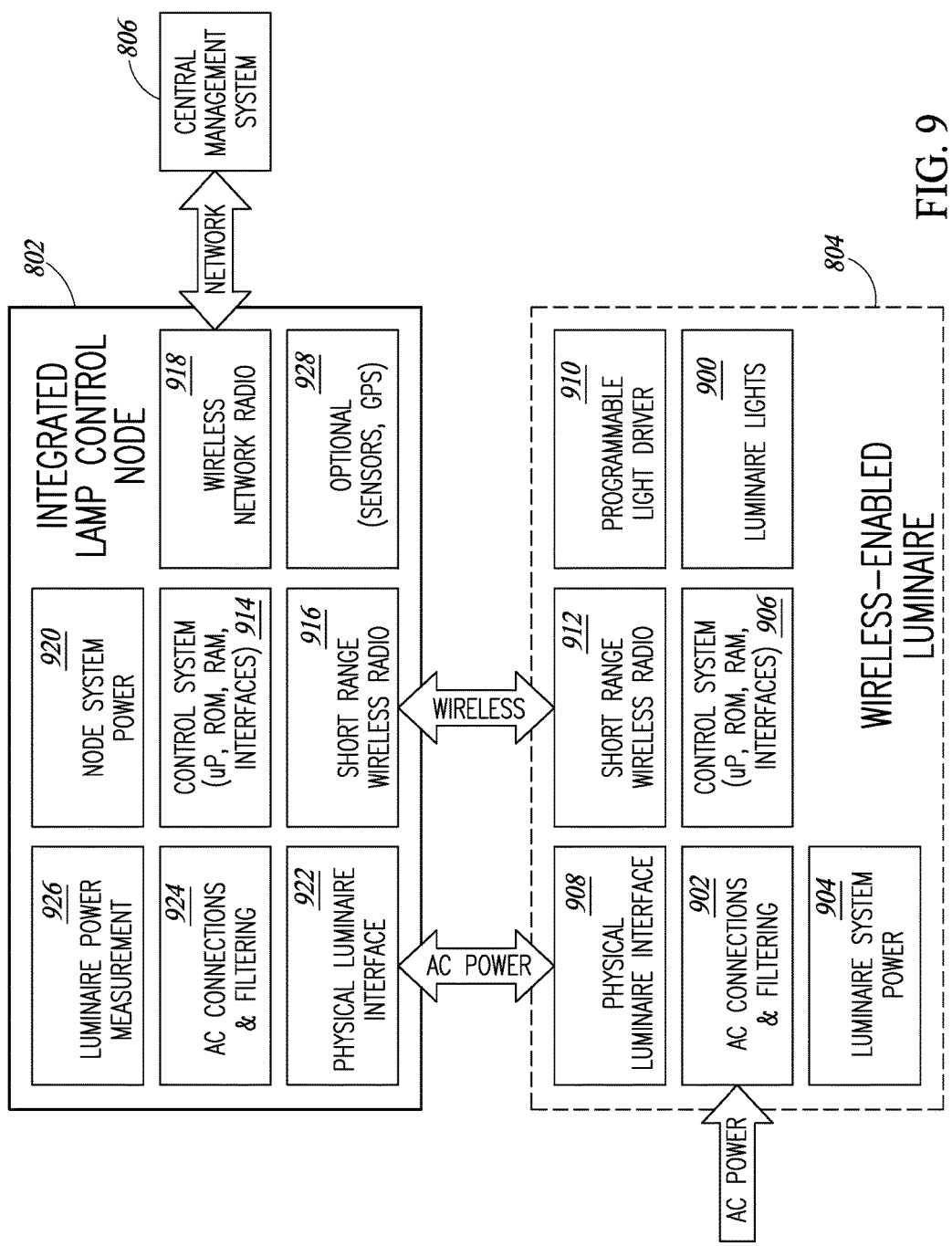
FIG. 9 is a functional block diagram of the integrated lamp control node of FIG. 8, according to one illustrated implementation.

FIG. 9 illustrates the integrated lamp control node 802 and luminaire 804 of FIG. 8 and their interfaces in more detail. The luminaire 804 includes one or more light sources 900 (e.g., LEDs), AC connections and filtering circuitry 902, a power supply system 904, a control system 906 (e.g., one or more processors), a physical luminaire interface 908, a programmable light driver 910, and a wireless short-range radio or transceiver 912 which communicates via a wireless communications protocol (e.g., Bluetooth®). The features of many of these components are discussed above.

The lamp control node 802 includes a control system 914, a short-range wireless radio or transceiver 916, a wireless network radio or transceiver 918, a power supply system 920, a physical luminaire interface 922, AC connections and filtering circuitry 924, a luminaire power measurement module 926, and optional sensors and/or a GPS receiver 928. As discussed above with reference to FIG. 8, the physical luminaire interface 922 of the integrated lamp control node 802 may be a standard plug (e.g., 3-pin, 5-pin, 7-pin) and the physical luminaire interface 908 of the luminaire 804 may be a standard receptacle (e.g., 3-pin, 5-pin, 7-pin).

The integrated lamp control node 802 provides several advantages. First, the control node 802 may be added to a wireless luminaire containing only a 3-pin receptacle originally controlled by a basic photocontrol for dusk and dawn transitions. This provides all of the extended control and status capabilities in the luminaire to be managed by a remote CMS without the expense of upgrading the luminaire's physical socket, wiring, and electronics required to support the standard implementation. Second, the control node 802 may be added to a 5-pin socket implementation designed for only remote 0-10 V analog control. This provides all of the control and status capabilities of a full 7-pin (DALI) implementation without added cost in the luminaire. In both of the above cases, the luminaire maintains the capability to interface to a smart appliance through the short range wireless interface (e.g., Bluetooth®). This provides a backup or alternative solution to the wireless network interface should the node or network fail and the luminaire's settings need to be adjusted.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Patent Publication No. 2016/0037605, published Feb. 4, 2016; PCT Publication No. WO2014/018773, published Jan. 30, 2014; U.S. Provisional Patent Application No. 61/723,675, filed Nov. 7, 2012; U.S.

Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Non-provisional patent application Ser. No. 15/369,559, filed Dec. 5, 2016; U.S. Provisional Patent Application No. 62/397,709, filed Sep. 21, 2016; U.S. Provisional Patent Application No. 62/397,713, filed Sep. 21, 2016; U.S. Provisional Patent Application No. 62/327,939, filed Apr. 26, 2016; U.S. Provisional Patent Application No. 62/379,037, filed Aug. 24, 2016; and U.S. Provisional Patent Application No. 62/458,970, filed Feb. 14, 2017 are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A wireless adapter system, comprising:
an adapter system physical luminaire interface that is physically coupleable to a physical luminaire interface of a luminaire to receive alternating current (AC) power from the luminaire;
a first adapter system transceiver that in operation wirelessly communicates with a luminaire transceiver of the luminaire;
at least one processor communicatively coupled to the first adapter system transceiver; and
at least one nontransitory processor-readable storage medium operatively coupled to the at least one processor and storing at least one of data or instructions which, when executed by the at least one processor, cause the at least one processor to:
cause the first adapter system transceiver to at least one of:
wirelessly send data or instructions to the luminaire; or
wirelessly receive data or instructions from the luminaire.

2. The wireless adapter system of claim 1 wherein the adapter system physical luminaire interface comprises a 3-wire interface comprising an AC line connection, an AC neutral connection, and an AC switched line connection.

3. The wireless adapter system of claim 1 wherein the adapter system physical luminaire interface comprises a twist lock plug.

4. The wireless adapter system of claim 1 wherein the adapter system physical luminaire interface is selectively physically coupleable to a control node physical node interface of a control node in an integrated housing.

5. The wireless adapter system of claim 1, further comprising:
an adapter system physical node interface that is selectively physically coupleable to a control node physical node interface of a control node.

6. The wireless adapter system of claim 5 wherein the adapter system physical node interface comprises one of a 5-pin receptacle interface or a 7-pin receptacle interface.

7. The wireless adapter system of claim 5 wherein in operation the adapter system physical node interface provides AC power from the physical luminaire interface of the luminaire to the control node physical node interface of the control node.

8. The wireless adapter system of claim 5 wherein in operation the adapter system physical luminaire interface couples an AC line connection, a neutral connection, and a switched line connection of the luminaire to the control node physical node interface of the control node.

9. The wireless adapter system of claim 8 wherein in operation the adapter system physical node interface enables power switching to and power measurement of the luminaire by the control node.

10. The wireless adapter system of claim 5 wherein in operation the at least one processor:
receives, via the adapter system physical node interface, at least one of instructions or data; and
causes the first adapter system transceiver to wirelessly send the received at least one of instructions or data to the luminaire in a format that is readable by the luminaire.

11. The wireless adapter system of claim 5 wherein in operation the at least one processor:
receives, via the adapter system transceiver, at least one of instructions or data from the luminaire; and sends, via the adapter system physical node interface, the received at least one of instructions or data to the control node.

12. The wireless adapter system of claim 5 wherein the at least one processor comprises at least one of an analog dimming receiver or a digitally addressable lighting interface (DALI) transceiver.

13. The wireless adapter system of claim 5 wherein the adapter system physical luminaire interface, adapter system physical node interface, and the first adapter system transceiver are all disposed in an adapter system housing.

14. The wireless adapter system of claim 1, further comprising:
a second adapter system transceiver that in operation communicates wirelessly with an external device over a wireless network.

15. The wireless adapter system of claim 14 wherein in operation the at least one processor:
receives, via the second adapter system transceiver, at least one of instructions or data; and
causes the first adapter system transceiver to wirelessly send the received at least one of instructions or data to the luminaire in a format that is readable by the luminaire.

16. The wireless adapter system of claim 14 wherein in operation the at least one processor:
receives, via the first adapter system transceiver, at least one of instructions or data from the luminaire; and
sends, via the second adapter system transceiver, the received at least one of instructions or data to an external device over at least one communications network.

17. A method of operating a luminaire, the method comprising:
providing a wireless adapter system comprising an adapter system physical luminaire interface, a first adapter system transceiver, and at least one processor communicatively coupled to the first adapter system transceiver;
physically coupling the adapter system physical luminaire interface of the wireless adapter system to a luminaire physical node interface of a luminaire to receive alternating current (AC) power from the luminaire; and
causing, by the at least one processor, the first adapter system transceiver to at least one of wirelessly send data or instructions to the luminaire or wirelessly receive data or instructions from the luminaire.

18. The method of claim 17 wherein the adapter system physical luminaire interface comprises a 3-wire interface comprising an AC line connection, an AC neutral connection, and an AC switched line connection, and physically coupling the adapter system physical luminaire interface of the wireless adapter system to a luminaire physical node interface comprises physically coupling the AC line connection, the AC neutral connection, and the AC switched line connection to circuitry of the luminaire.

19. The method of claim 17 wherein the adapter system physical luminaire interface comprises a twist lock plug and physically coupling the adapter system physical luminaire interface of the wireless adapter system to a luminaire physical node interface comprises physically coupling the twist lock plug to a receptacle of the luminaire.

20. The method of claim 17 wherein the adapter system physical luminaire interface is selectively physically coupleable to a control node physical node interface of a control node in an integrated housing.

21. The method of claim 17 wherein the wireless adapter system comprises an adapter system physical node interface, the method further comprising:
physically coupling the adapter system physical node interface to a control node physical node interface of a control node.

22. The method of claim 21 wherein the adapter system physical node interface comprises one of a 5-pin receptacle interface or a 7-pin receptacle interface, and physically coupling the adapter system physical node interface to a control node physical node interface of a control node comprises physically coupling the one of a 5-pin receptacle interface or the 7-pin receptacle interface to a plug of the control node.

23. The method of claim 21, further comprising:
providing, via the adapter system physical luminaire interface, AC power from the physical luminaire interface of the luminaire to the control node physical node interface of the control node.

24. The method of claim 21, further comprising:
receiving, by the at least one processor via the adapter system physical node interface, at least one of instructions or data; and
causing, by the at least one processor, the first adapter system transceiver to wirelessly send the received at least one of instructions or data to the luminaire in a format that is readable by the luminaire.

25. The method of claim 21, further comprising:
receiving, by the at least one processor via the first adapter system transceiver, at least one of instructions or data from the luminaire; and
sending, by the at least one processor via the adapter system physical node interface, the received at least one of instructions or data to the control node.

26. The method of claim 17 wherein the wireless adapter system comprises a second adapter system transceiver, the method further comprising:
communicating, via the second adapter system transceiver, wirelessly with an external device over a wireless network.

27. The method of claim 26, further comprising:
receiving, by the at least one processor via the second adapter system transceiver, at least one of instructions or data; and
causing, by the at least one processor, the first adapter system transceiver to wirelessly send the received at least one of instructions or data to the luminaire in a format that is readable by the luminaire.

28. The method of claim 26, further comprising:
receiving, by the at least one processor via the first adapter system transceiver, at least one of instructions or data from the luminaire; and
sending, by the at least one processor via the second adapter system transceiver, the received at least one of instructions or data to an external device over at least one communications network.

* * * * *